United States Patent
Oltheten et al.

(10) Patent No.: US 9,630,724 B2
(45) Date of Patent: Apr. 25, 2017

(54) SINGLE-GAUGE MONITORING OF MULTIPLE COMPONENTS

(71) Applicant: Bell Helicopter Textron Inc., Fort Worth, TX (US)

(72) Inventors: Erik Oltheten, Azle, TX (US); Aaron Halverson, Grapevine, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 100 days.

(21) Appl. No.: 13/932,456

(22) Filed: Jul. 1, 2013

(65) Prior Publication Data
US 2014/0246537 A1    Sep. 4, 2014

Related U.S. Application Data

(60) Provisional application No. 61/772,158, filed on Mar. 4, 2013.

(51) Int. Cl.
| | | |
|---|---|---|
| *B64C 27/00* | (2006.01) | |
| *B64D 43/00* | (2006.01) | |
| *G01D 7/08* | (2006.01) | |

(52) U.S. Cl.
CPC ........... *B64D 43/00* (2013.01); *B64C 27/008* (2013.01); *G01D 7/08* (2013.01)

(58) Field of Classification Search
CPC .... B64D 45/00; B64D 2045/00; G01C 23/00; G01D 7/00; G01D 7/06; G01D 7/08
See application file for complete search history.

(56) References Cited

U.S. PATENT DOCUMENTS

| | | | |
|---|---|---|---|
| 5,121,112 A | 6/1992 | Nakadozono | |
| 7,031,812 B1 * | 4/2006 | Pettigrew et al. | 701/14 |
| 7,143,003 B2 * | 11/2006 | Certain | 702/144 |
| 7,212,942 B2 * | 5/2007 | Vollum | 702/127 |
| 7,414,544 B2 * | 8/2008 | Oltheten et al. | 340/946 |
| 7,420,476 B2 * | 9/2008 | Stiffler | G01C 23/00 340/945 |
| 2004/0254747 A1 * | 12/2004 | Vollum | 702/50 |
| 2005/0278084 A1 * | 12/2005 | Certain | 701/3 |

(Continued)

FOREIGN PATENT DOCUMENTS

GB    975033 A    11/1964

OTHER PUBLICATIONS

Bell Helicopter Textron Inc. et al., Bell BasiX-Pro® Integrated Avionics System Pilot's Quick Reference Guide, Jan. 5, 2013.

(Continued)

*Primary Examiner* — Philip J Bonzell

(57) ABSTRACT

According to one embodiment, a gauge display prioritization system comprises a priority engine and an output engine. The priority engine is operable to receive a measurement from a first sensor associated with a first aircraft component and a measurement from a second sensor associated with a second aircraft component, select a prioritization criterion based on the received measurements, and select one priority measurement from the received measurements based on the prioritization criterion. The output engine is operable to instruct a gauge disposed within a cockpit to display information representative of the one priority measurement to a pilot.

21 Claims, 6 Drawing Sheets

(56) References Cited

U.S. PATENT DOCUMENTS

2006/0164261 A1\* 7/2006 Stiffler .................. G01C 23/00
                                                            340/945
2008/0140268 A1    6/2008 Todini
2008/0246633 A1   10/2008 Pouzolz
2009/0306839 A1\* 12/2009 Youngquist et al. .......... 701/14
2011/0112806 A1    5/2011 Kisor et al.

OTHER PUBLICATIONS

European Official Action in related European Application No. 13196349.8, dated Feb. 2, 2016, 6 pages.

\* cited by examiner

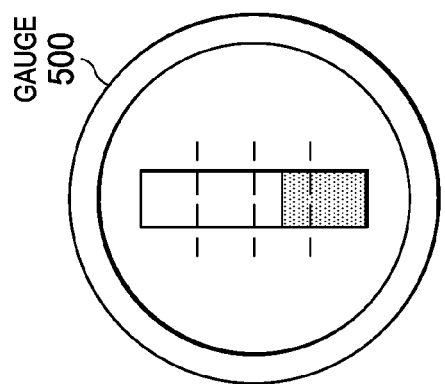
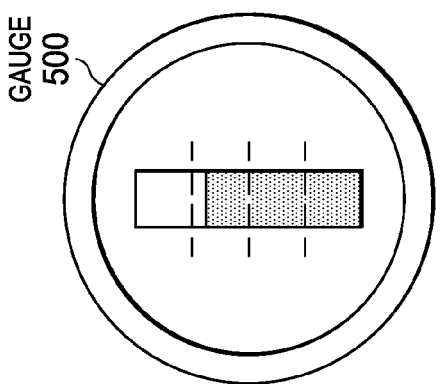
FIG. 5A
FIG. 5B
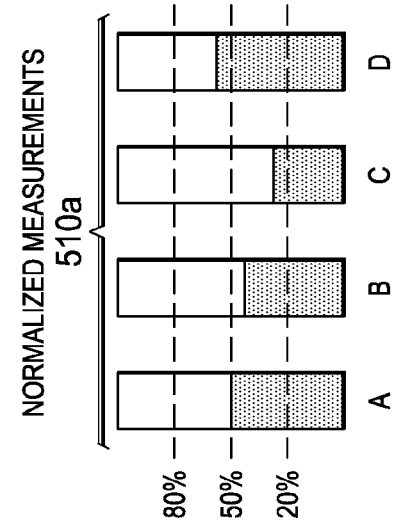
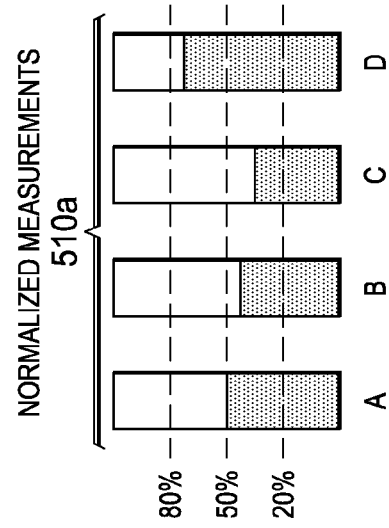

SINGLE-GAUGE MONITORING OF MULTIPLE COMPONENTS

RELATED APPLICATIONS

Pursuant to 35 U.S.C. §119 (e), this application claims priority to U.S. Provisional Patent Application Ser. No. 61/772,158, SINGLE-GAUGE MONITORING OF MULTIPLE COMPONENTS, filed Mar. 4, 2013. U.S. Provisional Patent Application Ser. No. 61/772,158 is hereby incorporated by reference.

TECHNICAL FIELD

This invention relates generally to avionics gauges, and more particularly, to a single-gauge monitoring of multiple components.

BACKGROUND

One example of an aircraft is a rotorcraft. A rotorcraft may include one or more rotor systems. One example of a rotorcraft rotor system is a main rotor system. A main rotor system may generate aerodynamic lift to support the weight of the rotorcraft in flight and thrust to counteract aerodynamic drag and move the rotorcraft in forward flight. Another example of a rotorcraft rotor system is a tail rotor system. A tail rotor system may generate thrust in the same direction as the main rotor system's rotation to counter the torque effect created by the main rotor system.

SUMMARY

Particular embodiments of the present disclosure may provide one or more technical advantages. A technical advantage of one embodiment may include the capability to present important information to a pilot regarding multiple components. A technical advantage of one embodiment may also include the capability to alert a pilot to potential issues regarding multiple components. A technical advantage of one embodiment may also include the capability to present important information to a pilot without overwhelming the pilot with unimportant information. A technical advantage of one embodiment may also include the capability to reduce cockpit clutter.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which:

FIGS. 5A and 5B show a single-output gauge that may replace four different gauges according to one example embodiment.

DETAILED DESCRIPTION OF THE DRAWINGS

Figure 1:
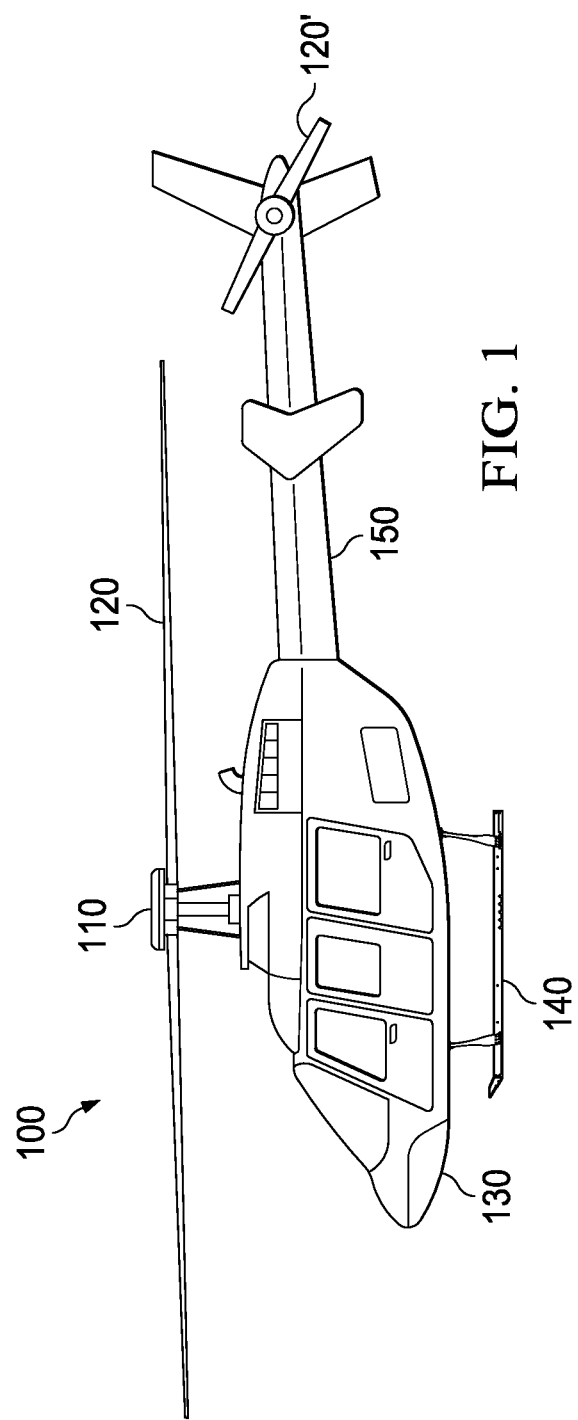
FIG. 1 shows a rotorcraft according to one example embodiment.

FIG. 1 shows a rotorcraft 100 according to one example embodiment. Rotorcraft 100 features a rotor system 110, blades 120, a fuselage 130, a landing gear 140, and an empennage 150. Rotor system 110 may rotate blades 120. Rotor system 110 may include a control system for selectively controlling the pitch of each blade 120 in order to selectively control direction, thrust, and lift of rotorcraft 100. Fuselage 130 represents the body of rotorcraft 100 and may be coupled to rotor system 110 such that rotor system 110 and blades 120 may move fuselage 130 through the air. Landing gear 140 supports rotorcraft 100 when rotorcraft 100 is landing and/or when rotorcraft 100 is at rest on the ground. Empennage 150 represents the tail section of the aircraft and features components of a rotor system 110 and blades 120'. Blades 120' may provide thrust in the same direction as the rotation of blades 120 so as to counter the torque effect created by rotor system 110 and blades 120. Teachings of certain embodiments relating to rotor systems described herein may apply to rotor system 110 and/or other rotor systems, such as other tilt rotor and helicopter rotor systems. It should also be appreciated that teachings regarding rotorcraft 100 may apply to aircraft and vehicles other than rotorcraft, such as airplanes and unmanned aircraft, to name a few examples.

Aircraft such as rotorcraft 100 may include a cockpit, which may feature a variety of gauges. These gauges may provide information regarding performance of rotorcraft 100 and/or performance of its components. In some examples, gauges may display measurements of component performance (e.g., component temperature, component pressure, component speed). Measurement of component performance may include any measurement indicative of performance of the component. For example, measurement of transmission performance may include measurement of the temperature or pressure of the fluid flowing through the transmission.

Increasing the number of gauges may increase the amount of information that is available to the pilot. Increasing the number of gauges, however, may overwhelm the pilot and/or clutter the cockpit information panel. Accordingly, teachings of certain embodiments recognize the capability to reduce the number of gauges in the cockpit by combining multiple gauges. As will be explained in greater detail, teachings of certain embodiments recognize the capability to combine measurements from multiple sensors into a single-output gauge.

Figure 2A:
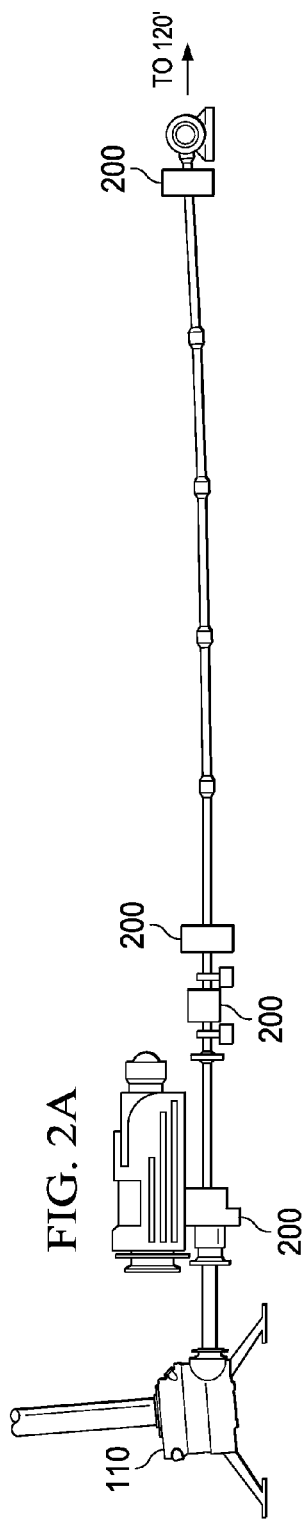
FIGS. 2A, 2B, and 2C show example variations of the tail rotor drive system of the rotorcraft of FIG. 1.
Figure 2B:
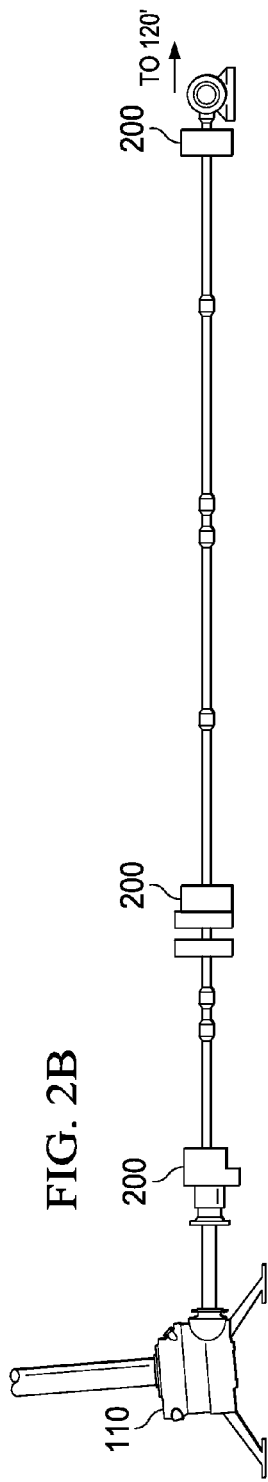
Figure 2C:
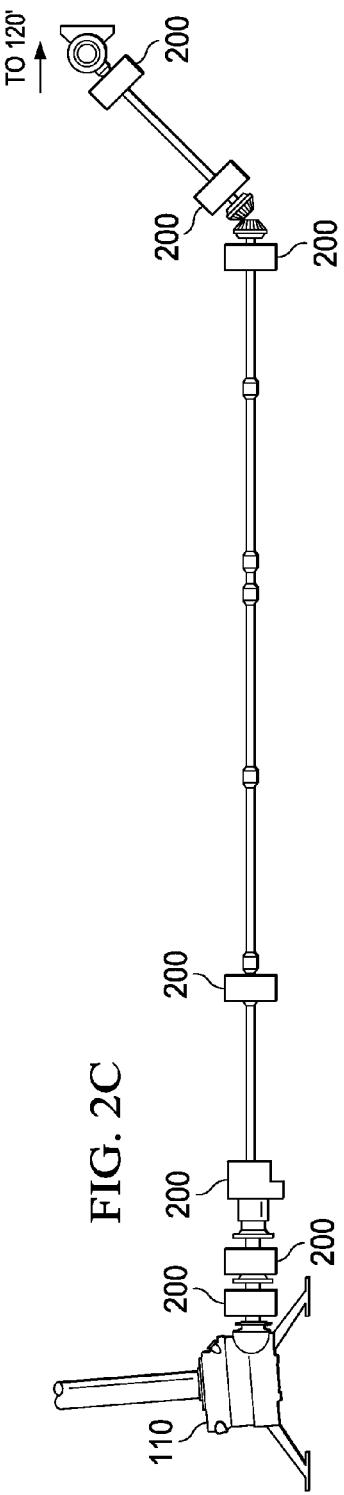

For example, teachings of certain embodiments recognize the ability to combine measurements from related sensors into a single-output gauge. Sensors may be deemed related for a variety of reasons. In one example, sensors are deemed related if they measure performance of different components within the same subsystem. For example FIGS. 2A, 2B, and 2C show example variations of the tail rotor drive system of rotorcraft 100. In each of these example variations, sensors may be provided to measure performance of various components 200. Examples of components 200 may include, but are not limited to, gear boxes, transmissions, motors, and other mechanical devices. In the examples of FIGS. 2A, 2B, and 2C, the sensors may be deemed related, for example, because measure they measure performance of different components 200 within the same subsystem (here, within the same tail rotor drive system).

In another example, sensors are deemed related if they provide similar information to the pilot. Information may be deemed similar, for example, if the pilot would react in the same manner to a change in sensor output regardless of which sensor provided the change. Returning to the example of FIGS. 2A, 2B, and 2C, sensors measuring performance of components 200 may be deemed similar, for example, because the pilot may react to a change in sensor output in the same manner regardless of which sensor provides the change. If one sensor, for example, indicates a loss of fluid pressure in a component 200, the pilot may respond in the same manner regardless of which component 200 suffers the loss in pressure.

Examples are not limited to a tail rotor system. For example, pilot action may also be similar if an abnormal condition is detected in either the rotor transmission or a separate combining gearbox in mechanical and/or fluid communication with the rotor transmission. As yet another example, pilot action may also be similar if an abnormal condition is detected in either the engine or in a separate reduction gearbox in mechanical and/or fluid communication with the engine.

In these examples, a cockpit could include multiple gauges, each gauge providing information indicating performance of each component 200. Teachings of certain embodiments recognize, however, the ability to replace these multiple gauges with a single-output gauge.

Figure 3:
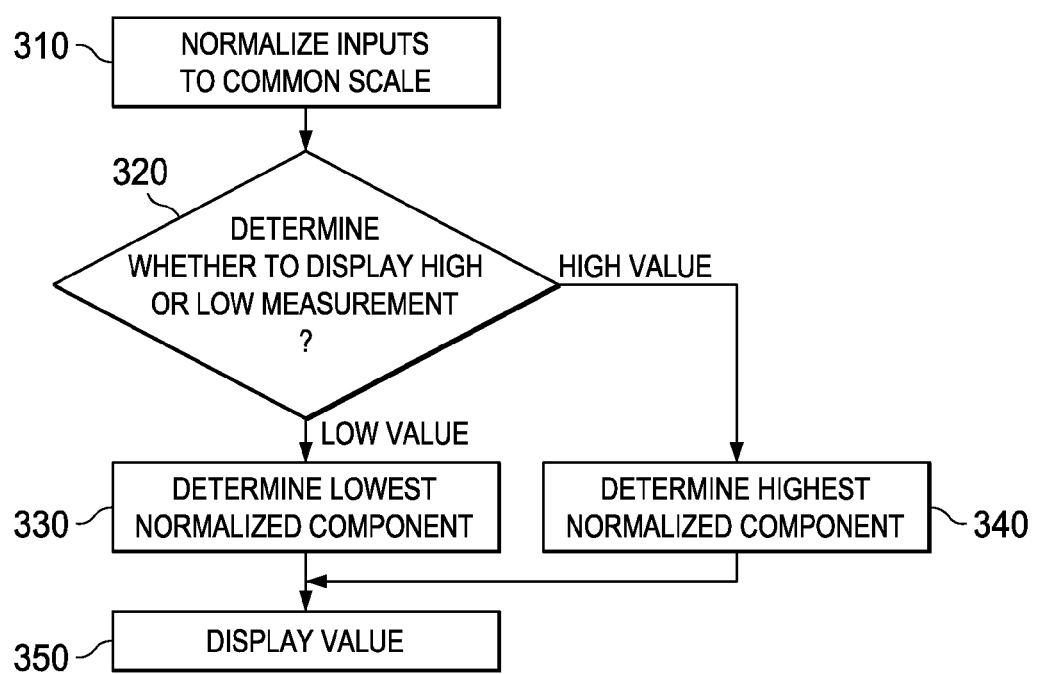
FIG. 3 shows a method 300 of provide a single gauge output from multiple sensor inputs according to one example embodiment.

FIG. 3 shows a method 300 of provide a single gauge output from multiple sensor inputs according to one example embodiment. At step 310, the inputs from each sensor are normalized to a common scale. Teachings of certain embodiments recognizing that normalizing sensor inputs to a common scale may facilitate display of a single output representative of the multiple inputs.

Figure 4:
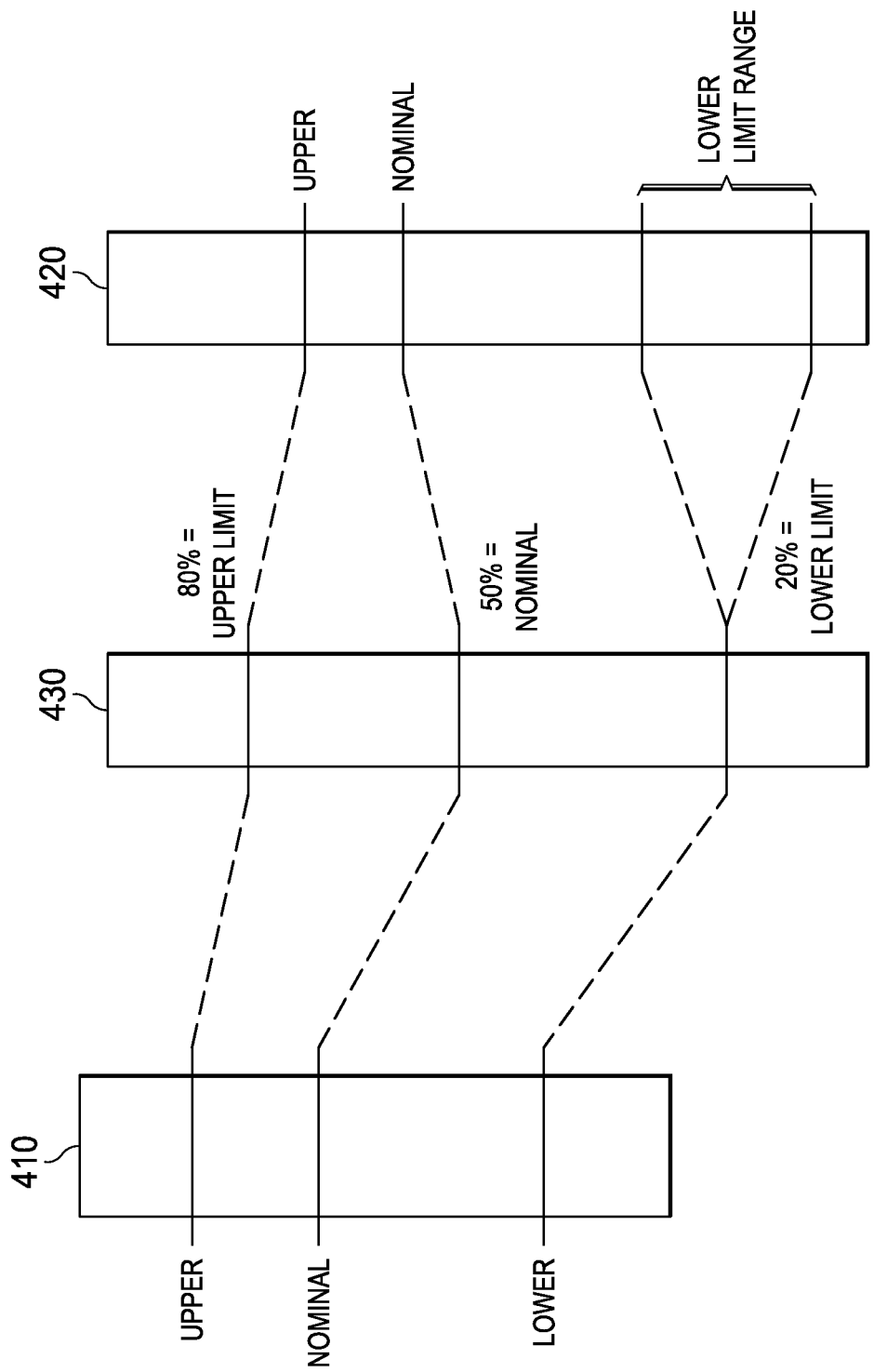
FIG. 4 shows normalization of two inputs to a common scale according to one example embodiment.

In one example embodiment, inputs from each sensor are normalized to a common scale such that the upper limits, the lower limits, and the normal operating levels match for each sensor input. For example, FIG. 4 shows normalization of two inputs 410 and 420 to a common scale 430. In this example, the upper limits of both inputs 410 and 420 are scaled to the 80% level of scale 430, the lower limits of both inputs 410 and 420 are scaled to the 20% level of scale 430, and the normal operating levels of inputs 410 and 420 are scaled to the 50% level of scale 430.

In some examples, limits, operating levels, and other parameters may change as a function of time, operating condition, or other variable. For example, as seen in FIG. 4, the lower limit of input 420 is variable as a function of operating condition. In this example, the lower limit of input 420 is lower at engine startup and is higher when rotorcraft 100 is in flight. Teachings of certain embodiments recognize the capability to change the scaling between the input and the common scale based on changes in the limits, operating levels, and other parameters.

Returning to the example of FIG. 3, a prioritization criterion is selected at step 320. A prioritization criterion may represent a criterion for determining which received measurement is most important and/or which received measurement should be displayed. In the example shown in FIG. 3, the prioritization criterion is selected at step 320 by deciding whether to show the highest or lowest value. For example, if step 310 provides four normalized measurements of a specific parameter (e.g., pressure, temperature, etc.), then step 320 may determine whether the highest of the four normalized measurements should be displayed or the lowest of the four normalized measurements should be displayed. In some embodiments, the goal of step 320 may be to determine which value is more important to the pilot: the highest value or the lowest value.

The decision regarding whether to show the highest or lowest value may depend on a variety of factors. For example, the decision may depend on which parameter is being displayed. For example, step 320 may determine that the lowest pressure input should be displayed. Step 320 may determine that the low pressure value is more important to the pilot because, for example, pressure loss in a component may be more serious and/or likely than over pressurization of the component. Step 320 may also provide exceptions to this determination. For example, step 320 may determine that the highest pressure input should be displayed if each component is above a minimum acceptable threshold and one component's pressure exceeds a threshold (such as a threshold approaching the upper limit). If, for example, all normalized pressure measurements are above 25% and one component's normalized pressure measurement is above 75%, then step 320 may determine that the highest normalized pressure measurement should be displayed.

As another example, step 320 may determine that the highest temperature input should be displayed. Step 320 may determine that the high temperature value is more important to the pilot because, for example, high temperature in a component may be more serious than low temperature in the component. Again, however, step 320 may provide exceptions to this determination. For example, step 320 may determine that the lowest temperature input should be displayed if each component's temperature is below an acceptable threshold and one component's temperature is sufficiently low.

After selecting the prioritization criterion at step 320, one priority measurement may be selected from the received measurements based on the prioritization criterion. Returning to the example of FIG. 3, the prioritization criterion may determine whether the highest or lowest measurement value should be displayed. If, for example, step 320 determines that the lowest value should be displayed, then the lowest normalized component is determined at step 330. Step 330 may determine, for example, which component within a system is responsible for the lowest value measurement. On the other hand, if step 320 determines that the highest value should be displayed, then the highest normalized component is determined at step 340. Step 340 may determine, for example, which component within a system is responsible for the highest value measurement.

Information representative of the measurement for the selected component may then be displayed at step 350. In some embodiments, the information representative of the measurement may indicate the value of the measurement, such as by displaying a numerical value or another graphical indicator. In some embodiments, the measurement for the selected component may be displayed on the normalized scale. Teachings of certain embodiments recognize that providing a single gauge that displays the highest or lowest normalized value may allow the single gauge to concisely provide information to the pilot about how the entire subsystem is operating.

For example, FIGS. 5A and 5B show how a single-output gauge 500 may replace four different gauges. In both examples, a subsystem includes four sensors that measure pressure at four different components A-D. In the example of FIG. 5A, four normalized measurements 510a are provided. In this example, a rule applies that the lowest pressure be displayed to the pilot. Accordingly, in this example, gauge 500 in FIG. 5A displays the normalized pressure measurement for component C, which is lowest among components A-D.

In the example of FIG. 5B, four normalized measurements 510b are provided. In this example, however, an exception to the rule of FIG. 5A applies because all pressures are above a minimum acceptable threshold (e.g., 25%) and one component's normalized pressure measurement exceeds another threshold (e.g., 75%). Accordingly, in this example, gauge 500 in FIG. 5B displays the normalized pressure measurement for component D, which is highest among components A-D.

Gauge 500 may represent any device inside a cockpit that displays information. Gauge 500 may be either analog or digital. In some embodiments, gauge 500 may indicate whether the displayed information is the highest value or the lowest value. In other embodiments, gauge 500 may not indicate whether the displayed information is the highest value or the lowest value. Rather, in these embodiments, such indication may be omitted because it is already apparent to the pilot (e.g., the pilot knows the highest measurement is being displayed because of how high the measurement is) or because the pilot does not care (e.g., if the pilot sees a very high measurement being displayed, the pilot may not care whether other measurements are higher or lower because even one very high measurement indicates a problem).

Teachings of certain embodiments recognize that a single-output gauge such as gauge 500 may reduce the amount of work necessary for the pilot to monitor system gauges. For the example, the pilot may monitor one gauge for a subsystem rather than gauges for each component of the subsystem. In some embodiments, gauge 500 may be associated with one subsystem as a whole even though it may only display measurements for one component of the subsystem at a given time. For example, gauge 500 may be a "drive system" gauge even though it only displays information for one component of the drive system at a time.

In addition, teachings of certain embodiments recognize that gauge 500 may take up less dashboard space than providing multiple gauges for each component. Furthermore, gauge 500 may allow the pilot to monitor trends. For example, if pressure in one component is steadily decreasing towards the lower limit, that decrease may be shown to the pilot over time.

Figure 6:
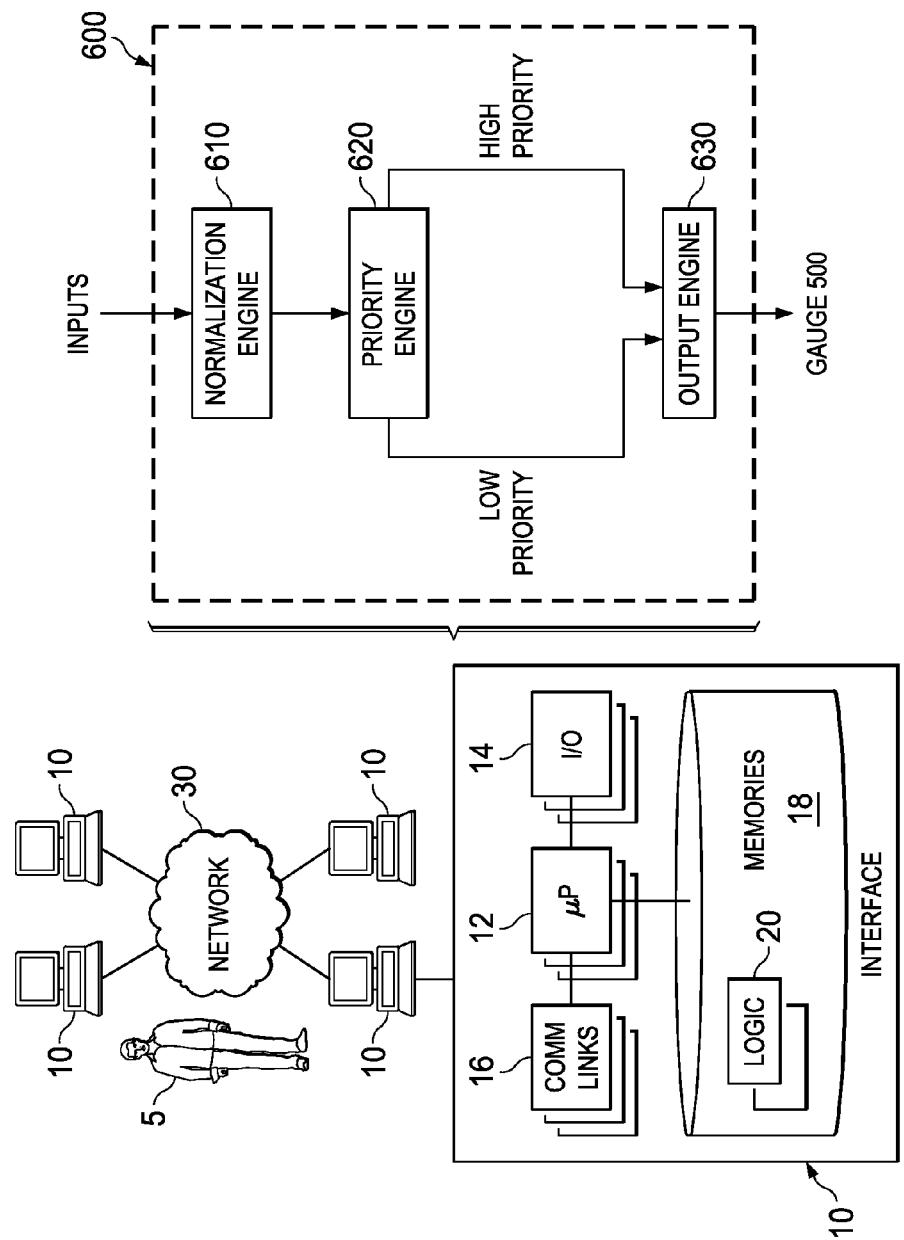
FIG. 6 shows a system for providing a single gauge output from multiple sensor inputs according to one example embodiment.

FIG. 6 shows a display prioritization system 600 for providing a single gauge output from multiple sensor inputs according to one example embodiment. In the example of FIG. 6, display prioritization system 600 features a normalization engine 610, a priority engine 620, and an output engine 630, which may be implemented by one or more computers 10 and may be accessed by a user 5.

Users 5 may access display prioritization system 600 through computer systems 10. For example, in some embodiments, user 5 is a pilot who reads a gauge that displays information from output engine 630 and is associated with a computer system 10. Users 5 may include any individual, group of individuals, entity, machine, and/or mechanism that interacts with computer systems 10. Examples of users 5 include, but are not limited to, a pilot, service person, engineer, technician, contractor, agent, and/or employee. Users 5 may be associated with an organization. An organization may include any social arrangement that pursues collective goals. One example of an organization is a business. A business is an organization designed to provide goods or services, or both, to consumers, governmental entities, and/or other businesses.

Computer system 10 may include processors 12, input/output devices 14, communications links 16, and memory 18. In other embodiments, computer system 10 may include more, less, or other components. Computer system may be operable to perform one or more operations of various embodiments. Although the embodiment shown provides one example of computer system 10 that may be used with other embodiments, such other embodiments may utilize computers other than computer system 10. Additionally, embodiments may also employ multiple computer systems 10 or other computers networked together in one or more public and/or private computer networks, such as one or more networks 30.

Processors 12 represent devices operable to execute logic contained within a medium. Examples of processor 12 include one or more microprocessors, one or more applications, and/or other logic. Computer system 10 may include one or multiple processors 12.

Input/output devices 14 may include any device or interface operable to enable communication between computer system 10 and external components, including communication with a user or another system. Example input/output devices 14 may include, but are not limited to, a mouse, keyboard, display, and printer.

Network interfaces 16 are operable to facilitate communication between computer system 10 and another element of a network, such as other computer systems 10. Network interfaces 16 may connect to any number and combination of wireline and/or wireless networks suitable for data transmission, including transmission of communications. Network interfaces 16 may, for example, communicate audio and/or video signals, messages, internet protocol packets, frame relay frames, asynchronous transfer mode cells, and/or other suitable data between network addresses. Network interfaces 16 connect to a computer network or a variety of other communicative platforms including, but not limited to, a public switched telephone network (PSTN); a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable network interfaces; or any combination of the preceding.

Memory 18 represents any suitable storage mechanism and may store any data for use by computer system 10. Memory 18 may comprise one or more tangible, computer-readable, and/or computer-executable storage medium. Examples of memory 18 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

In some embodiments, memory 18 stores logic 20. Logic 20 facilitates operation of computer system 10. Logic 20 may include hardware, software, and/or other logic. Logic 20 may be encoded in one or more tangible, non-transitory media and may perform operations when executed by a computer. Logic 20 may include a computer program, software, computer executable instructions, and/or instructions capable of being executed by computer system 10. Example logic 20 may include any of the well-known OS2, UNIX, Mac-OS, Linux, and Windows Operating Systems or other operating systems. In particular embodiments, the operations of the embodiments may be performed by one or more computer readable media storing, embodied with, and/or encoded with a computer program and/or having a stored and/or an encoded computer program. Logic 20 may also be embedded within any other suitable medium without departing from the scope of the invention.

Various communications between computers 10 or components of computers 10 may occur across a network, such as network 30. Network 30 may represent any number and combination of wireline and/or wireless networks suitable for data transmission. Network 30 may, for example, communicate internet protocol packets, frame relay frames, asynchronous transfer mode cells, and/or other suitable data between network addresses. Network 30 may include a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable communication links; or any combination of the preceding. Although the illustrated embodiment shows one network 30, teachings of certain embodiments recognize that more or fewer networks may be used and that not all elements may communicate via a network. Teachings of certain embodiments also recognize that communications over a network is one example of a mechanism for communicating between parties, and any suitable mechanism may be used.

In operation, according to one example embodiment, normalization engine 610 receives inputs from two or more sensors. Normalization engine 610 normalizes each input to a common scale. Priority engine 620 selects a prioritization criterion. For example, in one embodiment, priority engine 620 determines whether to show the highest or the lowest normalized value provided by normalization engine 610.

Prioritization engine 620 then selects one priority measurement from the received measurements based on the prioritization criterion. Returning to the previous example, the prioritization criterion may identify whether to display the highest or lowest normalized value. If, for example, priority engine 620 prioritizes the lowest normalized value, then output engine 630 will provide instructions to an output device, such as gauge 500, to display the lowest normalized value. If, on the other hand, priority engine 620 prioritizes the highest normalized value, then output engine 630 will provide instructions to the output device to display the highest normalized value. Gauge 500 may then display information representative of the prioritized measurement.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

Although several embodiments have been illustrated and described in detail, it will be recognized that substitutions and alterations are possible without departing from the spirit and scope of the present invention, as defined by the appended claims.

To aid the Patent Office, and any readers of any patent issued on this application in interpreting the claims appended hereto, applicants wish to note that they do not intend any of the appended claims to invoke paragraph 6 of 35 U.S.C. §112 as it exists on the date of filing hereof unless the words "means for" or "step for" are explicitly used in the particular claim.

What is claimed is:

1. A rotorcraft, comprising:
a body;
a power train coupled to the body and comprising a power source and a drive shaft coupled to the power source;
a hub;
a rotor blade coupled to the hub;
a first sensor configured to measure a first performance aspect of a gearbox in mechanical or fluid communication with the power source;
a second sensor configured to measure a second performance aspect of a gearbox in mechanical or fluid communication with the power source, the first and second performance aspects both being either temperature aspects or pressure aspects;
a gauge disposed within a cockpit of the body and operable to display information to a pilot; and
a display prioritization system configured to:
receive a first measurement from the first sensor and a second measurement from the second sensor;
select a prioritization criterion based on at least the received first and second measurements;
select, without user input, one priority measurement for display from the received measurements based on the prioritization criterion selected by the display prioritization system; and
instruct the gauge to display information representative of the one priority measurement selected by the display prioritization system without user input such that the gauge displays only the information representative of the one priority measurement and does not display information representative of any other received measurements.

2. The rotorcraft of claim 1, wherein the display prioritization system is operable to select a prioritization criterion by selecting whether to display the highest value of the received measurements or the lowest value of the received measurements.

3. The rotorcraft of claim 1, wherein the first performance aspect is a temperature or pressure of a first gearbox in mechanical or fluid communication with the power source, and the second performance aspect is a temperature or pressure of a second gearbox in mechanical or fluid communication with the power source.

4. The rotorcraft of claim 1, wherein:
the display prioritization system is operable to normalize the first measurement and the second measurement to a common scale; and
the display prioritization system is operable to select a prioritization criterion by selecting the prioritization criterion based on at least the normalized first and second measurements.

5. The rotorcraft of claim 4, wherein the display prioritization system is operable to instruct the gauge to display information representative of the normalized value of the one priority measurement.

6. The rotorcraft of claim 1, wherein the first performance aspect and the second performance aspect are both pressure aspects, and the first measurement and the second measurement are both pressure measurements.

7. The rotorcraft of claim 6, wherein the display prioritization system is configured to select as the one priority measurement the lowest value of the received pressure measurements.

8. The rotorcraft of claim 6, wherein the display prioritization system is configured to select as the one priority measurement either:
the highest value of the received pressure measurements, if all of the received pressure measurements are above thresholds approaching their respective lower limits and the highest value of the received pressure measurements is above a threshold approaching its upper limit, or
the lowest value of the received pressure measurements.

9. The rotorcraft of claim 6, wherein the display prioritization system is configured to:
normalize the received pressure measurements to a common scale;
select as the one priority measurement either:
the highest value of the normalized pressure measurements, if all of the normalized pressure measurements are above a threshold approaching a lower limit on the common scale and the highest value of the normalized pressure measurements is above a threshold approaching an upper limit on the common scale, or
the lowest value of the normalized pressure measurements; and
instruct the gauge to display information representative of the normalized value of the one priority measurement.

10. The rotorcraft of claim 1, wherein the first performance aspect and the second performance aspect are both temperature aspects, and the first measurement and the second measurement are both temperature measurements.

11. The rotorcraft of claim 10, wherein the display prioritization system is configured to select as the one priority measurement the highest value of the received temperature measurements.

12. The rotorcraft of claim 10, wherein the display prioritization system is configured to select as the one priority measurement either:
the lowest value of the received temperature measurements, if all of the received temperature measurements are below thresholds approaching their respective upper limits and the rotorcraft is operating in an engine startup condition, or
the highest value of the received temperature measurements.

13. The rotorcraft of claim 10, wherein the display prioritization system is configured to:
normalize the received temperature measurements to a common scale;
select as the one priority measurement either:
the lowest value of the normalized temperature measurements, if all of the normalized temperature measurements are below a threshold approaching an upper limit on the common scale and the rotorcraft is operating in an engine startup condition, or
the highest value of the normalized temperature measurements; and
instruct the gauge to display information representative of the normalized value of the one priority measurement.

14. A gauge display prioritization system comprising:
a priority engine operable to:
receive a first measurement from a first sensor associated with a rotorcraft gearbox and a second measurement from a second sensor associated with a rotorcraft gearbox, the first and second measurements both being either temperature measurements or pressure measurements,
select a prioritization criterion based on at least the received first and second measurements, and
select, without user input, one priority measurement for display from the received measurements based on the prioritization criterion selected by the display prioritization system; and
an output engine operable to instruct a gauge disposed within a cockpit to display information representative of the one priority measurement selected by the display prioritization system without user input to a pilot such that the gauge displays only the information representative of the one priority measurement and does not display information representative of any other received measurements.

15. The gauge display prioritization system of claim 14, wherein the display prioritization system is operable to select a prioritization criterion by selecting whether to display the highest value of the received measurements or the lowest value of the received measurements.

16. The gauge display prioritization system of claim 14, further comprising a normalization engine operable to normalize the first and second measurements to a common scale, wherein the display prioritization system is operable to select a prioritization criterion by selecting the prioritization criterion based on at least the normalized first and second measurements.

17. The gauge display prioritization system of claim 16, wherein the display prioritization system is operable to instruct the gauge to display information representative of the normalized value of the one priority measurement.

18. A method of prioritizing measurements for display on a single gauge in a rotorcraft, comprising:
receiving a first measurement from a first sensor associated with a gearbox and a second measurement from a second sensor associated with a gearbox, the first and second measurements both being either temperature measurements or pressure measurements;
selecting a prioritization criterion based on at least the received first and second measurements;
selecting, without user input, one priority measurement for display from the received measurements based on the prioritization criterion selected by the display prioritization system; and
instructing a gauge disposed within a cockpit to display information representative of the one priority measurement selected by the display prioritization system without user input to a pilot such that the gauge displays only the information representative of the one priority measurement and does not display information representative of any other received measurements.

19. The method of claim 18, wherein selecting a prioritization criterion comprises selecting whether to display the highest value of the received measurements or the lowest value of the received measurements.

20. The method of claim 18, further comprising normalizing the first and second measurements to a common scale, wherein selecting a prioritization criterion comprises selecting the prioritization criterion based on at least the normalized first and second measurements.

21. The method of claim 20, wherein instructing the gauge comprises instructing the gauge to display information representative of the normalized value of the one priority measurement.

* * * * *